United States Patent [19]
West et al.

[11] 3,747,350
[45] July 24, 1973

[54] POWER TRANSMISSION

[75] Inventors: Donald J. West, Warren; William J. Martin, II, Milford, both of Mich.

[73] Assignee: Sperry Rand Corporation, Troy, Mich.

[22] Filed: Feb. 3, 1972

[21] Appl. No.: 223,161

[52] U.S. Cl............ 60/459, 91/461, 60/493, 60/466
[51] Int. Cl............................ F15b 9/14
[58] Field of Search............ 60/53 R, 52 HE, 493, 60/466, 459; 91/461

[56] References Cited
UNITED STATES PATENTS
2,465,758  3/1949  Sedgwick et al.............. 60/52 HF
2,789,542  4/1957  Vander Kaay................. 60/53 R X Primary Examiner—Edgar W. Geoghegan
Attorney—Theodore Van Meter

[57] ABSTRACT

A hydraulic power transmission for driving and braking high inertia loads, such as the swing mechanism of a power shovel, uses a directional valve to control flow between the pressure source and the motor and a pilot operated relief valve to regulate the pressure in the supply. A triplex controller modulates the pilot pressure applied to the relief valve and simultaneously that applied to variably shift the directional valve. This enables an operator to modulate the pressure applied either in a driving or a braking direction to the fluid motor. When in the braking mode, the supply pressure is maintained at a low level only sufficient to charge the motor inlet while the motor decelerates.

7 Claims, 3 Drawing Figures

PATENTED JUL 24 1973

POWER TRANSMISSION

In the application of hydraulic power transmission to high inertia loads which are to be manually controlled, it is desirable to provide operator ability to modulate the torque applied to the load rather than to modulate its speed as is the case in most other hydraulic drives. Such devices as the swing mechanism of a power shovel are typical of loads which are best controlled by modulating torque rather than speed. It is, of course, necessary with such drives to be able to control reverse torque for braking as well as to permit the load to coast or to operate steadily against a fixed drag such as friction.

The control and drive systems for such purposes, which have heretofore been utilized most commonly require the use of a variable displacement pump and a rather complex system of controls for the same. Hydraulic power systems which depend upon a directional valve for control of the motor have heretofore not been easily adaptable to use in torque modulating systems. Proposals to this end have required either limitation to rather low power levels, if simplicity and reasonable cost are required, or, for high power drives, the operating controls for the directional valve become somewhat complex and expensive.

It is an object of the present invention to provide an improved power transmission system utilizing a directional valve between a pump and motor and a pilot operated relief valve and in which manual control over the torque applied to the motor may be exercised through a simple, reliable and inexpensive pilot control mechanism which simultaneously modulates the pilot pressure applied to the directional valve and to the relief valve.

The present invention accomplishes this by providing a hydraulic power transmission system having a pump, a motor, a pilot controlled relief valve, and a directional valve of the sliding spool type, and incorporating the improvement which comprises a pair of pilot pistons for shifting the valve in one direction or the other from a neutral position, spring means opposing the pilot pistons proportionally to the pressure applied to the pilot pistons, means forming continuously open restricted paths to each pilot piston from the pump, separate exhaust paths from each pilot piston, and a triplex controller selectively operable to open either one exhaust path or the other and simultaneously raise the pilot pressure at the relief valve and at one of the pilot pistons to any desired level.

IN THE DRAWINGS

Figure 1:
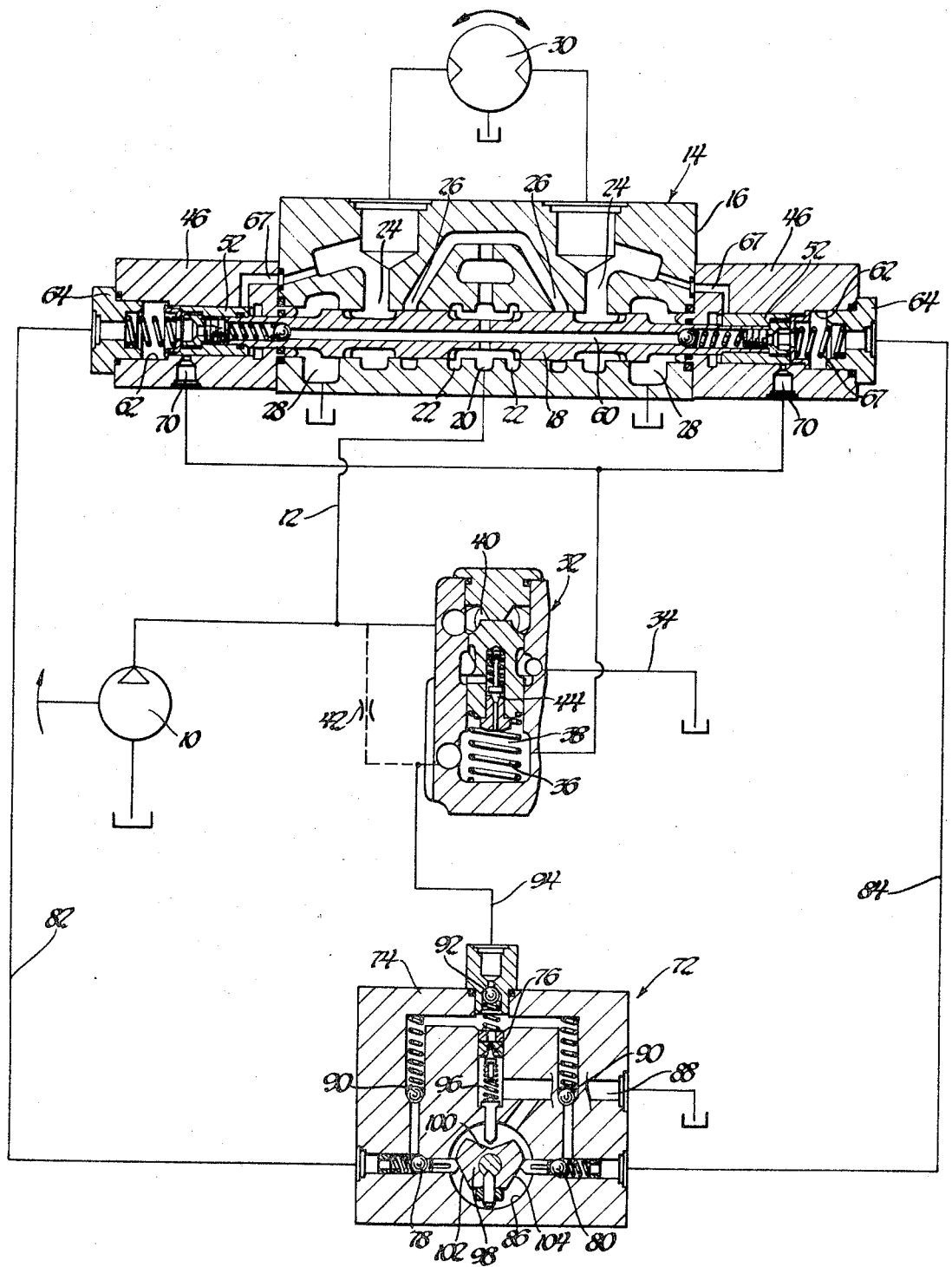
FIG. 1 is a diagrammatic view of a hydraulic circuit incorporating a preferred form of the present invention.

The circuit of FIG. 1 comprises a pressure source such as the fixed displacement unidirectional pump 10 connected by a delivery line 12 to a directional valve 14. This has a main body 16 and a spool 18 which may be of generally conventional form such as are used commonly in mobile excavating and material handling equipment. The body has an inlet port at 20 which is associated with the typical pump unloading porting 22 where other valves are supplied from the same source.

Motor ports 24 are straddled by supply ports 26 and return ports 28 at either end of the valve. A fluid motor 30 is connected across the motor ports 24 in the usual manner. The parts thus far described may be of any usual construction.

A pilot operated relief valve 32 which may be either separate or incorporated in the body 16 is teed into the delivery line 12 and when opened, exhausts to a return line 34. Valve 32 is of the pilot controlled type wherein a light spring 36 plus the pressure in a pilot control chamber 38 opposes delivery line pressure applied in the inlet chamber 40. Chamber 38 is supplied with fluid through a restriction 42 and the pressure in chamber 38 is limited by a pilot relief valve 44. When this pilot relief valve opens to permit flow to the exhaust line 34 at a more rapid rate than can enter through restriction 42, then the main relief valve will open, thus regulating the pressure in supply line 12, as is well known in the art. The pilot relief valve 44 serves as a maximum pressure limiter on the system as a whole.

Figure 3:
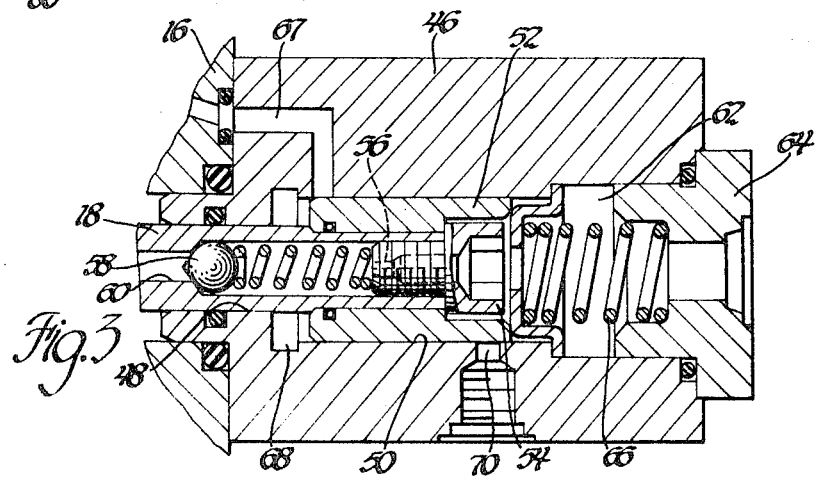
FIG. 3 is an enlarged sectional view of a portion of the directional valve illustrated in FIG. 1.

For the purpose of variably positioning the main spool 18, it is provided on each end with identical pressure responsive pilot operating mechanisms which are shown in enlarged detail in FIG. 3. Thus, an end cap 46 has a small bore 48 receiving the reduced end of the spool 18 and a larger bore 50 which receives a sleeve 52 secured to the spool 18 by a cap screw 54. The right-hand of sleeve 52 and screw 54 form a pilot piston of an area equal to the area of bore 50. The screw 54 has a central passage with a restricted portion 56 extending through the same and also acts to retain a spring biased ball check valve 58 which normally closes a central passage 60 extending from end to end of the main spool 18 and open to the inlet port 20.

The right-hand or outer end of the pilot piston 52, 54 is exposed over its full diameter to the pressure in an end chamber 62 which is closed by a small cap 64 and contains a biasing spring 66 which opposes motion of the main spool to the right in FIG. 3 under pressure exerted in the chamber 62 at the opposite end of the valve. Spring 66 is chosen to have a gradient such that in moving from minimum to maximum compression, the pressure in the opposite chamber 62 will have to rise from minimum to maximum value of the pilot pressure in chamber 38 of the relief valve 32. The value of this pressure at any time is only very slightly below the operating pressure in the main supply line 12.

The body 16 and the end cap 46 are provided with a passage 67 which communicates between the adjacent motor port 24 and a chamber 68 at the left-hand end of the sleeve 52. The annular area of this end serves as a braking piston which is exposed to motor outlet pressure when the motor is driven as a pump by inertial or gravity forces and the main spool 18 lies in FIG. 3 at any position to the right of the central position illustrated. The end cap 46 is also provided with a port 70 which is closed except when the main spool 18 lies to the left of the central position illustrated in FIG. 3. The parts associated with end cap 46 in FIG. 3 are duplicated identically at the opposite end of the directional valve as will be seen from FIG. 1.

A triplex controller 72 forms the medium through which manual control by an operator is exercised simultaneously upon the directional valve 14 and the relief valve 32. This comprises a body 74 containing a pilot relief valve 76 and a pair of ball poppet exhaust valves 78 and 80. The latter are connected by lines 82 and 84 to the left and right ends of the valve 14 through the small end caps 46. When opened, either valve 78 or 80 exhausts the respective chamber 62 into a chamber 86 in the body 74 which is connected to an exhaust passage 88. Check valves 90 connect the lines 82 and 84 to the relief valve 76. Likewise, the check valve 92 and line 94 connect the relief valve 76 to receive fluid from the chamber 38 of the pilot controlled main relief valve 32. Thus, the pressure in lines 82, 84 and 94 can never rise above the level determined by the pilot relief valve 76. This level is manually adjusted by means of its spring 96.

For the purpose of controlling the exhaust valves 78 and 80 as well as the spring 96, a manually operable rotary cam 98 is mounted in the chamber 86 and arranged to be operated manually by a connection, not illustrated, with a suitable handle. The cam 98 has a notch 100 which provides on either side of its center a pair of gradual rises by which the spring 96 may be variably compressed whenever the cam 98 is rotated away from its center position in either direction. The cam 98 also has a pair of rises 102 and 104 which more abruptly open the exhaust valves 78 and 80 respectively as the cam is shifted out of center position in one direction or the other.

In operation with the pump running and the valve 14 in central position as shown in FIG. 1, the pump will be unloaded through the inlet port 20 and bypass passages 22 and the motor 30 will be held locked hydraulically because spool 18 blocks both motor ports 24. During such conditions, the cam 98 will be held in central position, as shown, and pilot relief valve 76 will maintain only a very slight pressure in the control chamber 38 of relief valve 32, thus allowing the delivery of pump 10 to bypass to the exhaust conduit 34 at a relatively low pressure in supply line 12.

Figure 2:
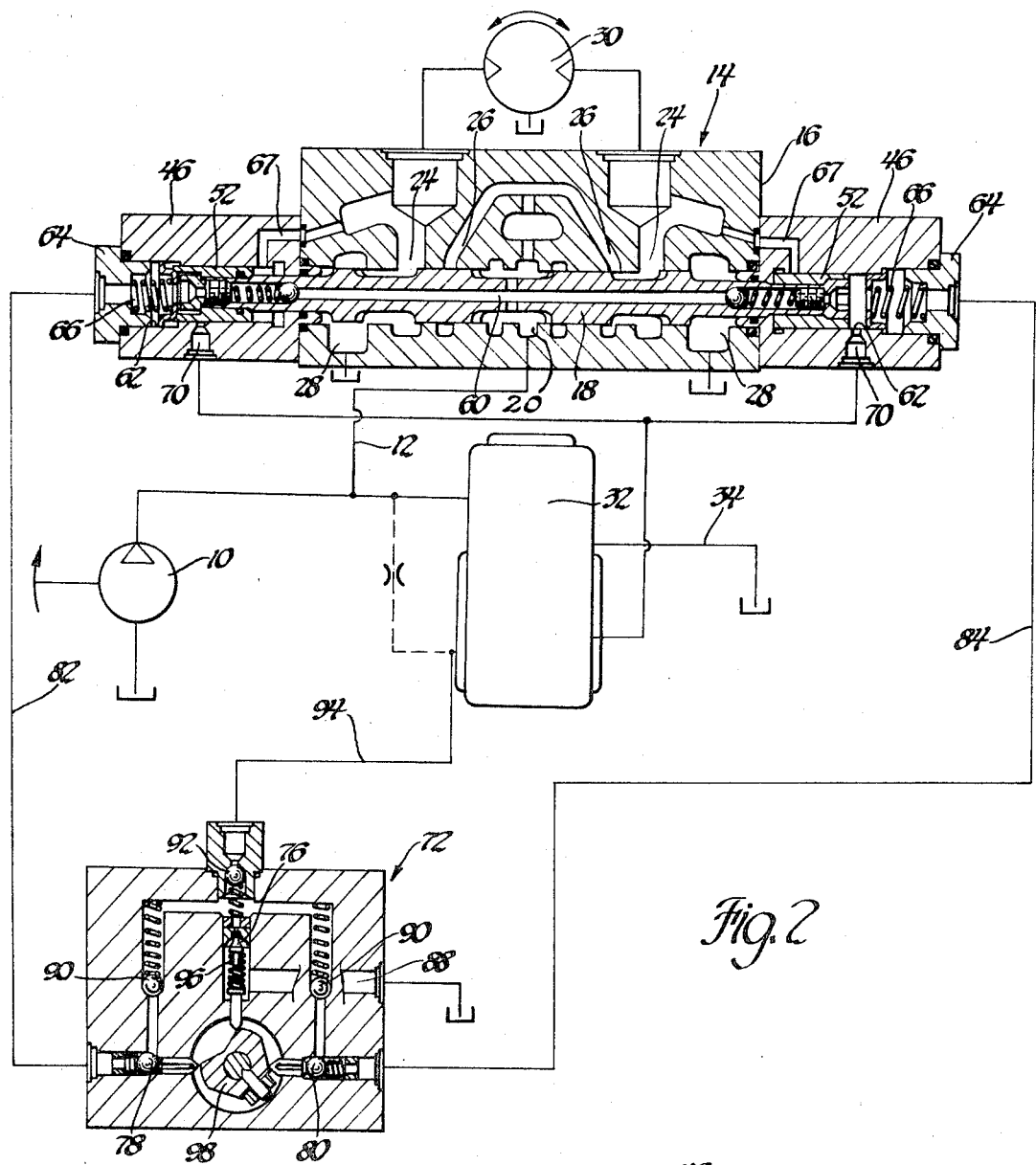
FIG. 2 is a view similar to FIG. 1 showing the parts in a different position.

When it is desired to apply a driving torque to the motor 30, the cam 98 is rotated, say for example counterclockwise, to set up the conditions illustrated in FIG. 2. Thus, the exhaust valve 78 has been opened to permit free flow out of the left-hand chamber 62 which is continuously supplied with a small flow from passage 60 through the check valve 58 and the restricted orifice 56 in the screw 54. Thus, only the spring 66 has opposed leftward movement of the spool 18. This movement is developed by pressure fluid admitted to the right-hand chamber 62 through the check valve and the restricted orifice. This pressure level is determined by the degree of compression of the spring 96 of pilot relief valve 76. The latter controls both the pressure in the chamber 38 of relief valve 32 and the pressure in chamber 62 at the right-hand end of the directional valve 14, these pressures being substantially equal neglecting the slight pressure drops through the lines and the check valve involved. The pressure applied by the pump 10 through line 12, right-hand port 26 and right-hand motor port 24 to the motor 30 is consequently limited to that value determined by the main relief valve 32 which in turn is determined by the pressure setting at the pilot relief valve 76. Thus, any degree of torque can be applied to the load which motor 30 operates by variably positioning the cam 98 to variably compress the spring 96 of the pilot relief valve. This condition obtains whenever it is desired to accelerate the load or to drive it steadily against gravity or friction loadings.

When it is desired to allow the motor to coast after an accelerating or steady speed operation, the cam 98 is restored to its central position. This does not, however, restore the spool 18 to its central position so long as there are inertial or gravity forces acting on the load and driving the motor 30 as a pump. Thus, the valve remains shifted to the left, as shown in FIG. 2, by reason of the pressure build-up in the motor return line which acts through the passage 67 on the braking area of the sleeve 52. This is opposed by the spring 66, there being no pressure in the left-hand chamber 62. The spring 66 biases the pilot piston 52, 54 toward the right and creates a slight restriction between motor return port 24 and tank port 28 which imposes a small drag on the motor 30 until it comes to rest. This restriction is automatically regulated by the motor outlet pressure acting on the braking piston area of sleeve 52 in opposition to the spring 66.

When it is desired to apply a braking torque to the load after it has been coasting as described, or in fact immediately after a forward driving operation, the cam 98 is moved beyond its central position in a clockwise direction to again compress the spring of pilot relief valve 76 and build up pressure in the left-hand chamber 62 upon the full area of pilot piston 52, 54. Thus, a stronger bias is applied to the pilot piston, tending to create more restriction between motor outlet port 24 and tank port 28 until sufficient pressure is built up in passage 67 to balance the additional bias. Thus, any desired degree of braking restriction can be imposed upon the overrunning motor.

Under braking conditions, it is not necessary to apply driving pressure to the motor, but merely to maintain sufficient pressure in the supply line 12 to charge the motor inlet. For this purpose, whenever the spool 18 lies to the left of center as illustrated in FIG. 2, the port 70 at the right-hand end is open which connects the chamber 38 of the relief valve 32 with the right-hand chamber 62. This is in turn exhausted through line 84 and check valve 80 by reason of cam 98 being rotated clockwise. Thus, no significant pressure can build up in chamber 38 and relief valve 32 dumps whatever pump flow is not utilized by the motor into exhaust line 34. Port 70 at the left-hand end of valve 14 is closed by the sleeve 52 and thus permits pressure to be built up to any desired degree in the left-hand chamber 62 by compression of the spring 96 of the pilot relief valve 76.

We claim:

1. In a hydraulic power transmission system having a pump, a motor, a pilot controlled relief valve, and a directional valve of the sliding spool type, that improvement which comprises a pair of pilot pistons for shifting the valve in one direction or the other from neutral position, spring means opposing the pilot pistons proportionately to the pressure applied to the pilot pistons, means forming continuously open restricted paths to each pilot piston from the pump, separate exhaust paths from each pilot piston, and a triplex controller selectively operable to open either one exhaust path or the other and simultaneously raise the pilot pressure at the relief valve and at one of the pilot pistons to any desired level.

2. A system as defined in claim 1 wherein the restricted paths are formed in the spool of the directional valve.

3. A system as defined in claim 1 wherein the triplex controller includes a rotary cam, a pair of adjacent rises on the cam and a pilot relief valve controlled by those rises, a pair of separated rises on the cam, and separate exhaust valves, each controlled by one of the separated rises.

4. A system as defined in claim 1 having means for controlling the spool to apply a variable restriction to fluid returning from the motor when the motor is over-running comprising small area braking pistons opposed to each of the pilot pistons and a passage to each braking piston communicating with the fluid returning from the motor.

5. A system as defined in claim 4 having means for closing either last named passage when its respective pilot piston is shifted by applied pilot pressure.

6. A system as defined in claim 4 having means for unloading the pump when the spool is under the control of one of the braking pistons.

7. A system as defined in claim 6 wherein the last named means comprises a pair of passages connecting the relief valve to each pilot piston and controlled by each piston to open only when the pilot piston has shifted in opposition to the spring means.

* * * * *